United States Patent
Jain et al.

(10) Patent No.: US 12,244,652 B2
(45) Date of Patent: Mar. 4, 2025

(54) HOSTED CONFIDENTIAL DISCUSSION SYSTEM

(71) Applicant: COQUAL INC., New York, NY (US)

(72) Inventors: Pooja Jain, Bronx, NY (US); Jamell Moore, Peekskill, NY (US); Catherine Chapman, New York, NY (US)

(73) Assignee: COQUAL INC., New York, NY (US)

( * ) Notice: Subject to any disclaimer, the term of this patent is extended or adjusted under 35 U.S.C. 154(b) by 719 days.

(21) Appl. No.: 17/327,312

(22) Filed: May 21, 2021

(65) Prior Publication Data
US 2021/0367982 A1     Nov. 25, 2021

Related U.S. Application Data

(60) Provisional application No. 63/029,034, filed on May 22, 2020.

(51) Int. Cl.
| | |
|---|---|
| *H04L 65/1069* | (2022.01) |
| *G06F 3/04817* | (2022.01) |
| *G06F 3/0482* | (2013.01) |
| *G06F 40/174* | (2020.01) |
| *H04L 12/18* | (2006.01) |
| *H04L 65/1073* | (2022.01) |
| *H04L 65/403* | (2022.01) |
| *H04L 67/146* | (2022.01) |

(52) U.S. Cl.
CPC ...... *H04L 65/1069* (2013.01); *G06F 3/04817* (2013.01); *G06F 3/0482* (2013.01); *G06F 40/174* (2020.01); *H04L 12/1822* (2013.01); *H04L 65/1073* (2013.01); *H04L 65/403* (2013.01); *H04L 67/146* (2013.01)

(58) Field of Classification Search
None
See application file for complete search history.

(56) References Cited

U.S. PATENT DOCUMENTS

| | | | |
|---|---|---|---|
| 8,903,902 B2 * | 12/2014 | Niazi ............... | G06Q 10/00 709/227 |
| 9,077,850 B1 * | 7/2015 | Groves ............. | H04N 7/155 |

(Continued)

FOREIGN PATENT DOCUMENTS

| | | | | |
|---|---|---|---|---|
| EP | 4297030 A2 * | 12/2023 | ......... | G06F 3/0484 |
| KR | 20170038807 A * | 4/2017 | | |
| WO | WO-2023028170 A1 * | 3/2023 | ......... | H04L 65/1089 |

*Primary Examiner* — Melvin H Pollack
(74) *Attorney, Agent, or Firm* — ArentFox Schiff LLP

(57) ABSTRACT

Examples described herein generally relate to a system for providing a live multi-party session. The system may include a participant interface that displays a programmed screen including a plurality of questions on a participant device, each question including at least one selectable response. At least one of the selectable responses includes a text box configured to receive a freeform response and a display area configured to show responses to the question from other participants, each participant identified by a randomized name. The system may include a host user interface including: a navigation panel that displays a name of each of a plurality of programmed screens and indicates the programmed screen displayed to the participants; a participant panel indicating how many of the questions each participant has completed; and an response panel indicating, for each question, selected responses of the participants.

17 Claims, 13 Drawing Sheets

(56) References Cited

U.S. PATENT DOCUMENTS

| | | | |
|---|---|---|---|
| 9,317,704 B2* | 4/2016 | Brudnicki | G06Q 20/3227 |
| 9,369,673 B2* | 6/2016 | Ma | H04N 7/141 |
| 9,380,268 B2* | 6/2016 | Weber | H04L 65/1045 |
| 9,407,628 B2* | 8/2016 | Sondhi | H04L 63/20 |
| 9,455,977 B1* | 9/2016 | Bailey | H04L 9/32 |
| 9,781,385 B2* | 10/2017 | Ma | H04N 7/15 |
| 9,948,581 B2* | 4/2018 | Lee | H04L 65/4038 |
| 9,965,972 B2* | 5/2018 | King | G09B 7/02 |
| 10,108,613 B2* | 10/2018 | Spataro | G06F 16/93 |
| 10,235,025 B2* | 3/2019 | Falaki | H04N 21/4784 |
| 10,268,360 B2* | 4/2019 | Jones | G06F 3/045 |
| 10,324,587 B2* | 6/2019 | Dharmaji | G06F 3/0482 |
| 10,511,553 B2* | 12/2019 | Duquene | H04L 51/046 |
| 10,547,617 B2* | 1/2020 | Givoni | H04L 63/18 |
| 10,609,070 B1* | 3/2020 | Farmer, III | H04L 63/126 |
| 10,614,457 B2* | 4/2020 | Carrott | G06Q 20/40 |
| 10,798,096 B2* | 10/2020 | Touati | H04L 63/0853 |
| 10,826,909 B2* | 11/2020 | O'Connell | H04L 63/0846 |
| 10,904,481 B1* | 1/2021 | Morris | H04N 21/632 |
| 10,979,481 B2* | 4/2021 | Jayaweera | H04M 15/7655 |
| 10,997,558 B2* | 5/2021 | Platt | H04L 65/4053 |
| 11,080,336 B2* | 8/2021 | Van Dusen | G06Q 10/10 |
| 11,144,885 B2* | 10/2021 | Rosenberg | H04L 67/141 |
| 11,190,559 B1* | 11/2021 | Narayanaswamy | H04L 65/403 |
| 11,249,715 B2* | 2/2022 | Ashkenazi | G06F 3/1423 |
| 11,269,871 B1* | 3/2022 | Bigdelu | G06F 16/2428 |
| 11,330,026 B1* | 5/2022 | Han | H04L 65/4015 |
| 11,537,618 B2* | 12/2022 | Gupta | G06F 16/24537 |
| 11,601,295 B2* | 3/2023 | Kumar M R | H04L 67/60 |
| 11,604,799 B1* | 3/2023 | Bigdelu | G06F 3/0484 |
| 11,644,955 B1* | 5/2023 | Singamneni | G06F 3/0481 707/722 |
| 11,695,808 B2* | 7/2023 | Johnston | H04L 65/401 709/204 |
| 11,711,409 B2* | 7/2023 | Adams | H04L 65/1083 709/204 |
| 11,755,181 B2* | 9/2023 | Burd | G10L 15/26 715/753 |
| 11,755,997 B2* | 9/2023 | Bui | G06F 40/103 715/227 |
| 11,805,159 B2* | 10/2023 | Burd | H04N 21/4788 |
| 2010/0312900 A1* | 12/2010 | Daigle | H04M 3/2281 709/228 |
| 2016/0099984 A1* | 4/2016 | Karagiannis | H04L 12/1822 709/204 |
| 2016/0255139 A1* | 9/2016 | Rathod | H04N 1/32101 709/203 |
| 2017/0192735 A1* | 7/2017 | Faran | H04L 65/1069 |
| 2017/0279860 A1* | 9/2017 | Agarwal | H04L 65/1083 |
| 2018/0255114 A1* | 9/2018 | Dharmaji | G06F 16/435 |
| 2019/0173926 A1* | 6/2019 | Lal | H04L 65/1069 |
| 2020/0204527 A1* | 6/2020 | Vass | H04L 63/0428 |
| 2020/0228358 A1* | 7/2020 | Rampton | G06N 3/006 |
| 2020/0233699 A1* | 7/2020 | Occhialini | G06F 9/4881 |
| 2020/0364737 A1* | 11/2020 | Surati | H04L 51/02 |
| 2024/0087595 A1* | 3/2024 | Aher | G10L 15/22 |

\* cited by examiner

HOSTED CONFIDENTIAL DISCUSSION SYSTEM

CROSS-REFERENCE TO RELATED APPLICATIONS

The present application claims the benefit of priority of U.S. Provisional Patent Application No. 63/029,034 filed on May 22, 2020, which is incorporated by reference herein in its entirety.

TECHNICAL FIELD

The present disclosure relates to multi-party communication systems, and particularly to a hosted confidential discussion system.

BACKGROUND

Existing multi-party communication systems may allow multiple parties to communicate concurrently. For example, a conference call may allow audio communication and video calls may add video. Some systems may also allow a presenter to share a document. Such systems, however, may not be useful for confidential discussions. For example, such systems may not allow participants to respond confidentially. Additionally, such systems may not provide confidentiality because either the system may allow any party to join the communication or a party joining the communication may be identified to all other parties. Accordingly, participants in such communications may not feel free to provide honest responses.

Additionally, existing systems may not provide sufficient structure for a discussion. Although existing systems may control which participants are allowed to communicate, existing systems may not provide programming with which multiple participants can interact.

Thus, there is a need in the art for improvements in multi-party communication systems. In particular, there is a need for systems and methods for providing hosted confidential discussions.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method of controlling access to a real-time session. The method may include displaying, on a host interface, a session scheduling form. The method may include receiving, from a host via the session scheduling form, email addresses of invited participants, an indication of a registration type and a selection of one or more registration fields required for one or more of the invited participants to register for a session, and a selection of one or more joining fields required for one or more registered participants to join a session. The method may include generating, for each invited participant, an email including a hyperlink with a session-specific uniform resource locator (URL) for joining the session. The method may include receiving, from a participant device, a request to join the session-specific URL. The method may include serving a session joining page to the participant device in response to the request for the session-specific URL, the session joining page including one or more joining fields. The method may include receiving, from the participant device via the session joining page, the one or more joining fields. The method may include verifying that the one or more joining fields match registration information of the invited participant. The method may include admitting the invited participant into the real-time session in response to the verifying.

In another aspect, the disclosure provides a method of programming a real-time multi-party session. The method may include receiving, via a host interface, a selection of a new screen icon from a host. The method may include receiving, via the host interface, an indication of a question start sequence, a selection of a question type, question text, a selection of a response chart type, and a list of response options, each response option separated by a designated symbol. The method may include generating, for each response option, a response object including: an option prefix, option text, a deselect option, and a delete option. The method may include generating a question object including: a question number based on the question start sequence, the question text, and the response object for each response. The method may include adding the question object to the new screen.

In another aspect, the disclosure provides a method of providing a live multi-party session. The method may include loading a programmed session including a plurality of screens, each screen including a plurality of questions. The method may include receiving join requests from a plurality of participants, each join request originating from a session-specific URL provided to registrants and associated with the programmed session. The method may include verifying, for each of the plurality of participants, that the join request matches a registered participant. The method may include assigning each participant a randomized display name. The method may include presenting, on a respective user interface for each participant, a first screen of the plurality of screens in response to a command received via a host interface. The method may include receiving responses to the plurality of questions from the participants. The method may include displaying, on a host interface, an indication of a number of questions answered by each participant according to the randomized display name. The method may include displaying, on the user interface and the host interface, an indication of the response to each question.

In another aspect, the disclosure provides a system for providing a live multi-party session. The system may include a participant interface that displays a programmed screen including a plurality of questions on a participant device, each question including at least one selectable response. At least one of the selectable responses may include a text box configured to receive a freeform response and a display area configured to show responses to the question from other participants, each participant identified by a randomized name. The system may include a host user interface including: a navigation panel that displays a name of each of a plurality of programmed screens and indicates the programmed screen displayed to the participants; a participant panel indicating how many of the questions each participant has completed; and a response panel indicating, for each question, selected responses of the participants. For the freeform response, the response panel includes the display area configured to show responses to the question from participants. The responses may be attributed to the randomized name of each participant.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

In the drawings:

FIG. 11 is an example user interface for managing a question screen, in accordance with an implementation of the present disclosure.

FIG. 12 is an example user interface for managing a session, in accordance with an implementation of the present disclosure.

DETAILED DESCRIPTION

The present disclosure provides systems and methods for providing hosted confidential discussions. The disclosure provides techniques that allow a computer system provider to host confidential discussions where participation is limited to invited participants. The participants may be provided a randomized name that allows temporary identification without breaching confidentiality. A facilitator is able to guide the participants through a series of programed questions. Participant responses may be viewed by the facilitator and may be selectively shared with other participants or third party observers. The system may provide real-time analysis of the responses and generate reports.

Figure 1:
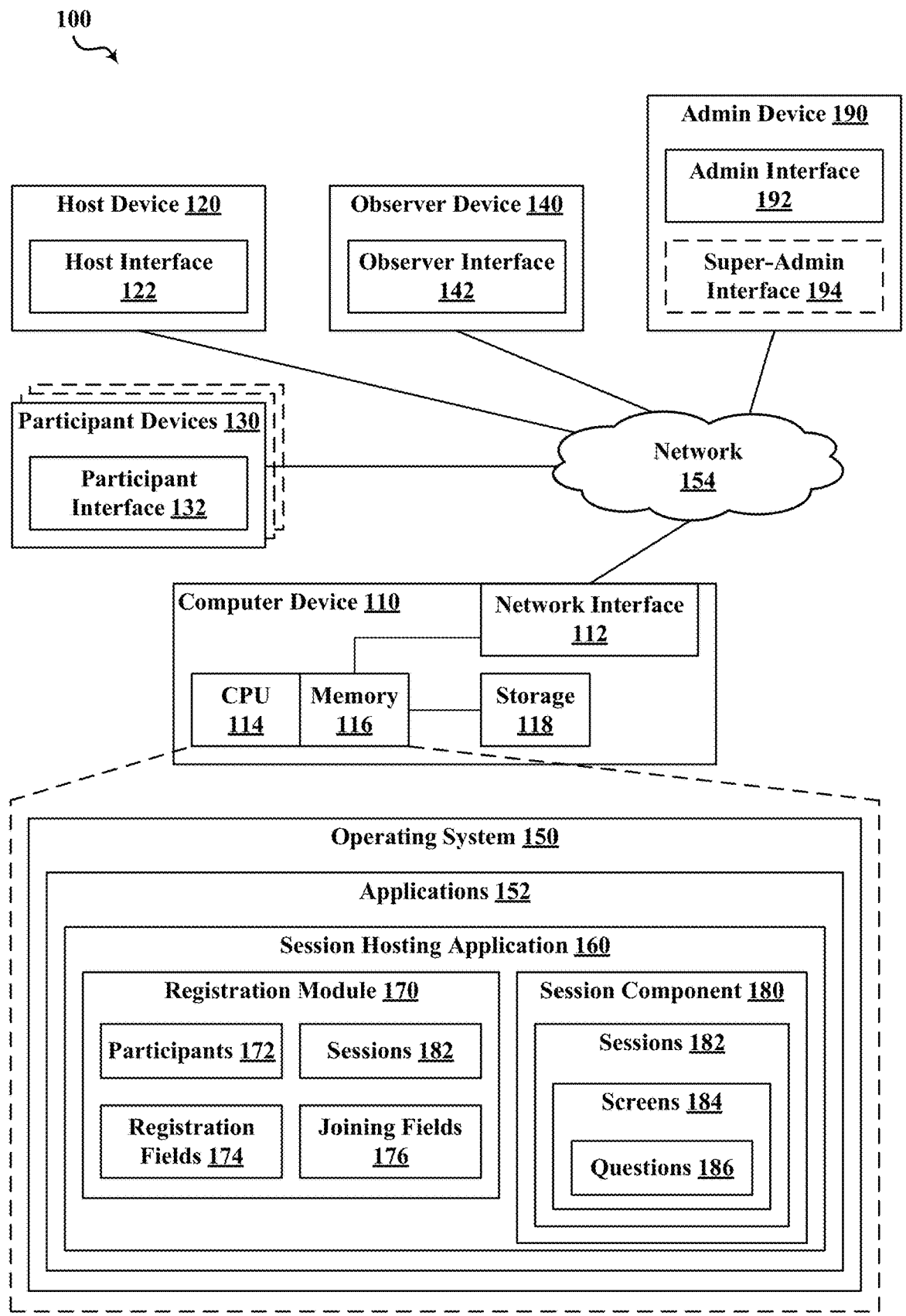
FIG. 1 is a diagram of an example computer system for providing a hosted confidential discussion system, in accordance with an implementation of the present disclosure.

Referring now to FIG. 1, an example session hosting system 100 includes a central computer device 110 and a plurality of user devices including at least one host device 120, a plurality of participant devices 130, and optional observer devices 140 and administrator devices 190. The central computer device 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing communications related data. In an aspect, the central computer device 110 may be implemented as one or more virtual machines hosted by a web services provider.

In an aspect, the session hosting system 100 may include a session hosting application 160 executed by the computer device 110. The session hosting system 100 may host a confidential multi-party session. In some implementations, the confidential multi-party session may be used for communications among a focus group. The session hosting application 160 may include a registration module 170 configured to invite participants 172 to a session 182. The participants 172 may each use a participant device 130 to register for and participate in the session 182, as described in further detail below. The registration module 170 may send an invitation including registration fields 174 to each invited participant 172. The registration module 170 may collect joining fields 176 when a participant 172 joins a session 182. The session hosting application 160 may include a session component 180 configured to host one or more sessions 182. Each session 182 may be programmed with screens 184, each including questions 186.

The computer device 110 may include a central processing unit (CPU) 114 that executes instructions stored in memory 116. For example, the CPU 114 may execute an operating system 150 and one or more applications 152, which may include the session hosting application 160. The computer device 110 may also include a network interface 112 for communication with external devices via a communications network 154. For example, the computer device 110 may communicate with a plurality of user devices including the host device 120, participant devices 130, and observer device 140.

Memory 116 may be configured for storing data and/or computer-executable instructions defining and/or associated with an operating system 150 and/or applications 152, and CPU 114 may execute operating system 150 and/or applications 152. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include or communicate with a storage device 118, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads. In an aspect, a graphics processing unit (GPU) may perform some operations of the CPU 114. For example, for blockchain operations, a GPU may be utilized for mining blocks (e.g., finding hash keys).

The operating system 150 may include instructions (such as applications 152) stored in memory 116 and executable by the CPU 114. The applications 152 may include a session hosting application 160 configured to communicate with user devices via a respective interface (e.g., host interface 122, participant interface 132, and observer interface 142, administrator interface 192). The session hosting application 160 may provide the host interface 122 that may be in communication with or otherwise operate in conjunction with a host device 120. The host interface 122 may be any user interface with which an end user may interact. For example, the host interface 122 may be a web-page that is accessed through a browser application executed on the host device 120. By loading the web-page, the browser application may effectively operate as a user interface for an application executed on the computer device 110 (e.g., in the case of a web server). As another example, the host interface 122 may be an application or operating system that runs on the host device 120.

The session hosting application 160 may also provide the participant interface 132 that may be in communication with or otherwise operate in conjunction with a participant device 130. The participant interface 132 may be any user interface with which an end user may interact. For example, the participant interface 132 may be a web-page that is accessed through a browser application executed on the participant device 130. By loading the web-page, the browser application may effectively operate as a user interface for an application executed on the computer device 110 (e.g., in the case of a web server). Such an implementation may allow various types of user devices to serve as a participant device 130 and participate in a communication session. For example, a communication session may include different types of participant devices 130 such as desktop computers, laptop computers, tablets, and smart phones. In an aspect, the participant interface 132 may acquire responses of a participant 172. For example, the participant interface 132 may display a session 182 that may include multiple screens 184 each including questions 186 that may be completed directly by a participant operating the participant device 130.

The session hosting application 160 may also provide the observer interface 142 that may be in communication with or otherwise operate in conjunction with an observer device 140. Similar to the participant interface 132, the observer interface 142 may be a web-page that is accessed through a browser application executed on the observer device 140. The observer interface 142 may allow an observer to view responses but not provide responses. In an implementation, the observer interface 142 may provide a private chat window with the host interface 122.

The session hosting application 160 may also provide the administrator interface 192 that may be in communication with or otherwise operate in conjunction with an administrator device 190. Similar to the participant interface 132, the administrator interface 192 may be a web-page that is accessed through a browser application executed on the administrator device 190. The administrator interface 192 may allow for multiple registered administrators to schedule, start, and/or facilitate sessions 182. A project may include multiple sessions with a same set of questions.

Alternatively or additionally, the session hosting application 160 may also provide a super-administrator interface 194 that may be in communication with or otherwise operate in conjunction with an administrator device 190. Similar to the participant interface 132, the super-administrator interface 194 may be a web-page that is accessed through a browser application executed on the administrator device 190. The super-administrator interface 194 may allow for making system-level changes to the session hosting application 160, such as managing (e.g., adding, removing, modifying) users registered as administrators. In an aspect, the super-administrator interface 194 may allow for purging of configuration and/or data of the session hosting application 160, such as deleting configuration and/or data related to projects, sessions, and/or reports. For example, the super-administrator interface 194 may allow for removal of non-anonymous participant data from reports. That is, the super-administrator interface 194 may facilitate compliance with one or more privacy standards and/or regulations of one or more regions (e.g., general data protection regulations (GDPR), California privacy laws and regulations).

Figure 2:
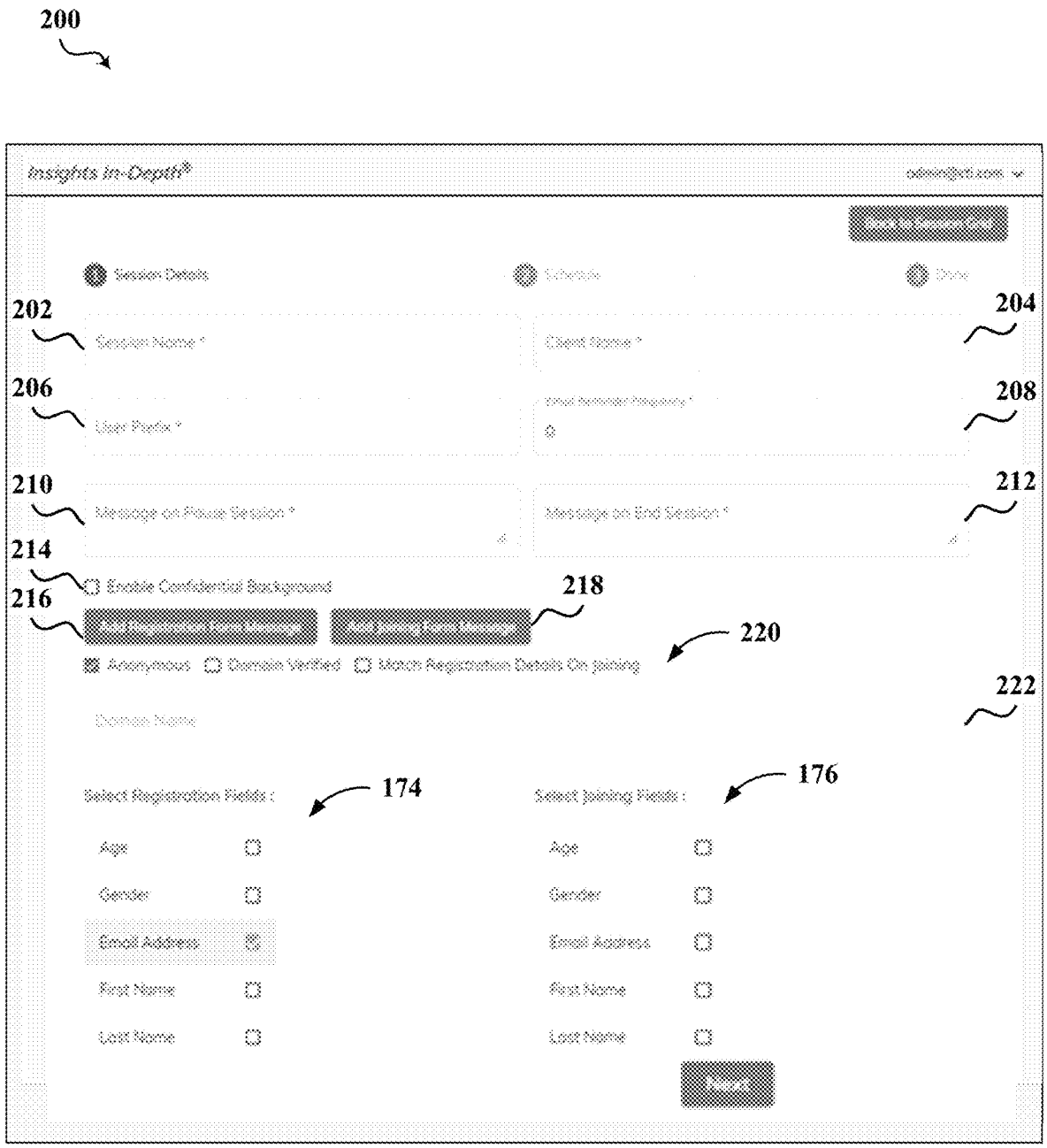
FIG. 2 is an example user interface for creating a session, in accordance with an implementation of the present disclosure.
Figure 3:
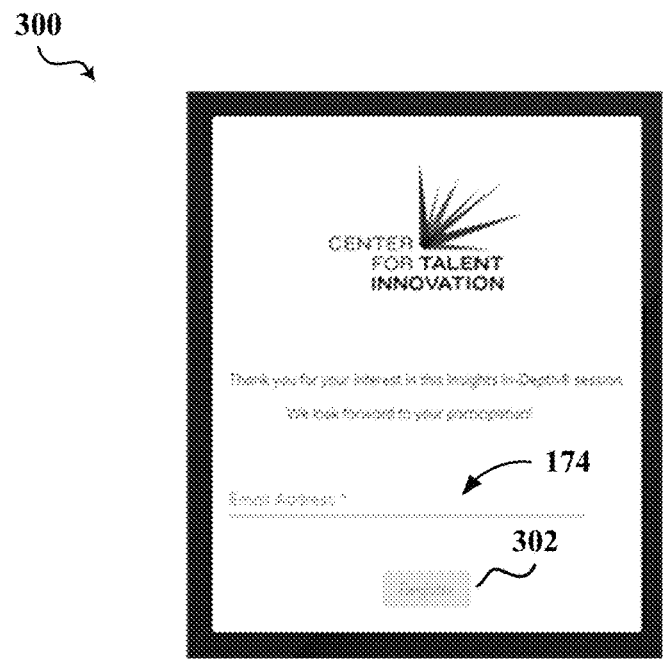
FIG. 3 is an example participant registration screen, in accordance with an implementation of the present disclosure.
Figure 4:
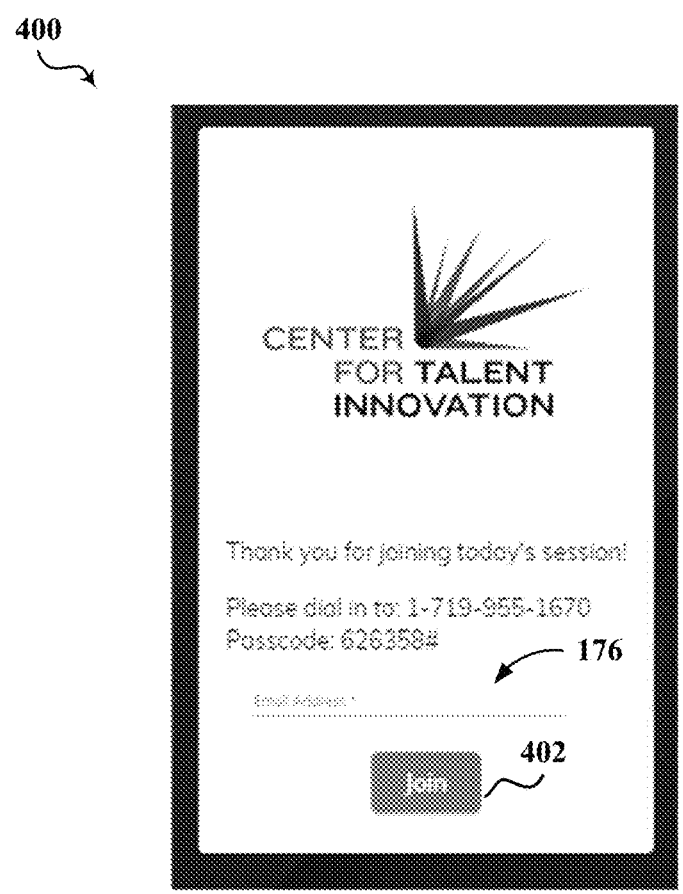
FIG. 4 is an example participant joining screen, in accordance with an implementation of the present disclosure.

FIG. 2 is an example user interface 200 for creating a session. The user interface 200 may be provided by the host interface 122. The user interface 200 may include fields for a session name 202, client name 204, user prefix 206, email reminder frequency 208, message on pause session 210, and message on end session 212. The session name may uniquely identify a session 182. The client name may identify an organization associated with the session. For example, the organization may be an employer of the participants, a research organization, or a business where the participants are potential customers. The user prefix may be used to generate randomized display names for the participants. The message on pause screen may be displayed when the session 182 is paused. The message on end screen may be displayed when the session 182 is stopped. The user interface 200 may include an option to enable a confidential background 214 that includes a watermark indicating that the session 182 is confidential. The user interface 200 may include an option to add a registration form message 216 to be included on the participant registration interface 300 (FIG. 3) and/or add a joining form message 218 to be included on the participant joining interface 400 (FIG. 4).

The user interface 200 may include options for selecting a registration type 220 for the session 182. The available registration types may include anonymous, domain verified, and match registration details on joining. An anonymous session may not collect registration information from participants 172. A domain verified session may require registration with a particular domain name (e.g., the client domain). The user interface 200 may include a domain name field 222. In other implementations, a domain name may be extracted from an email address for an invitation. The domain verified session may require confirmation of association with the particular domain name upon joining. For example, a domain verified session may send a participant specific code to an email address associated with the domain name to be used to join the session. A session using match registration details on joining may verify that information provided when joining matches information provided when registering.

The user interface 200 may include options for selecting registration fields 174. The registration fields 174 may be included on the participant registration interface 300 (FIG. 3). Example registration fields 174 may include email address, age, gender, first name, and last name. The user interface 200 may include options for selecting joining fields 176. The joining fields 176 may be included on the participant joining interface 400 (FIG. 4). Example joining fields 176 may include email address, age, gender, first name, and last name and may be the same as the registration fields 174. If or when the match registration details on joining registration type is selected, the user interface 200 may require that the joining fields 176 be the same as the registration fields 174.

FIG. 3 is an example participant registration interface 300. The participant registration interface 300 may be provided by the participant interface 132. The participant registration interface 300 may include the registration fields 174 selected in the user interface 200. For example, as illustrated, participant registration interface 300 includes an email address field. A participant 172 may enter information in the registration fields 174 and select the registration button 302 to register.

FIG. 4 is an example participant joining interface 400. The participant joining interface 400 may be provided by the participant interface 132. The participant joining interface 400 may include the joining fields 176 selected in the user interface 200. For example, as illustrated, participant joining interface 400 includes an email joining field. A participant 172 may enter information in the joining field 176 and select the join button 402 to join the session. In an implementation, the session hosting system 100 may provide audio and/or video communications to the session participants via a conference call. The participants may be muted and only the host may speak to guide participants through the questions. In other implementations, the computer device 110 and/or the session hosting application 160 may include a voice over internet protocol (VoIP) component, a soft internet protocol (IP) telephone, an application for streaming audio and/or video, and/or an application for facilitating real-time communications that may provide audio and/or video communications to the session participants.

Figure 5:
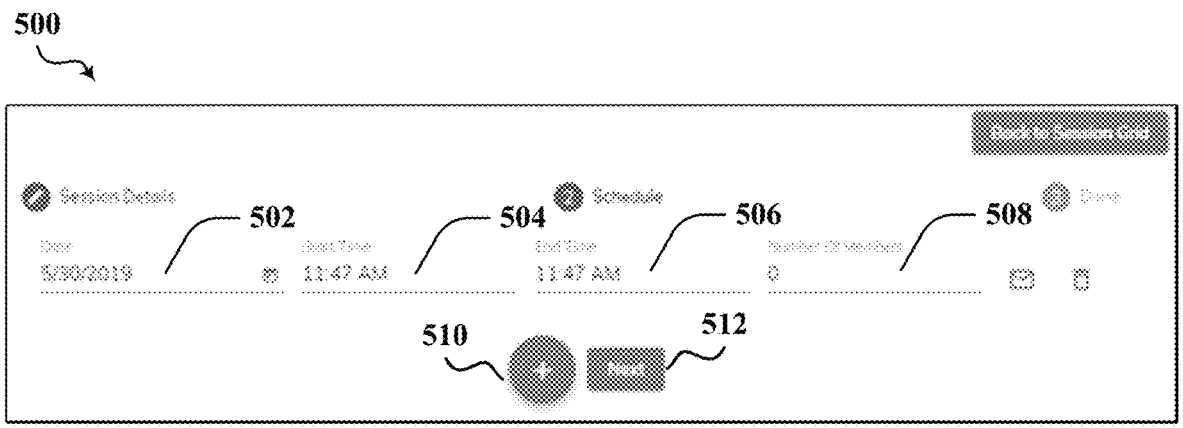
FIG. 5 is an example user interface for scheduling a session, in accordance with an implementation of the present disclosure.

FIG. 5 is an example user interface 500 for scheduling a session. The user interface 500 may be provided by the host interface 122. The user interface 500 may include fields for entering a date 502, start time 504, end time 506, and a number of members 508. The number of members may be a limit on a number of participants 172 that may register for the session 182. In an aspect, a session 182 may have multiple parts. A host may select the + icon 510 to add an additional part. The user interface 500 may include a next button 512. In response to a host user selecting the next button 512, the session hosting application 160 may generate a session object including the information provided in the user interface 200 and the information provided in the user interface 500.

Figure 6:
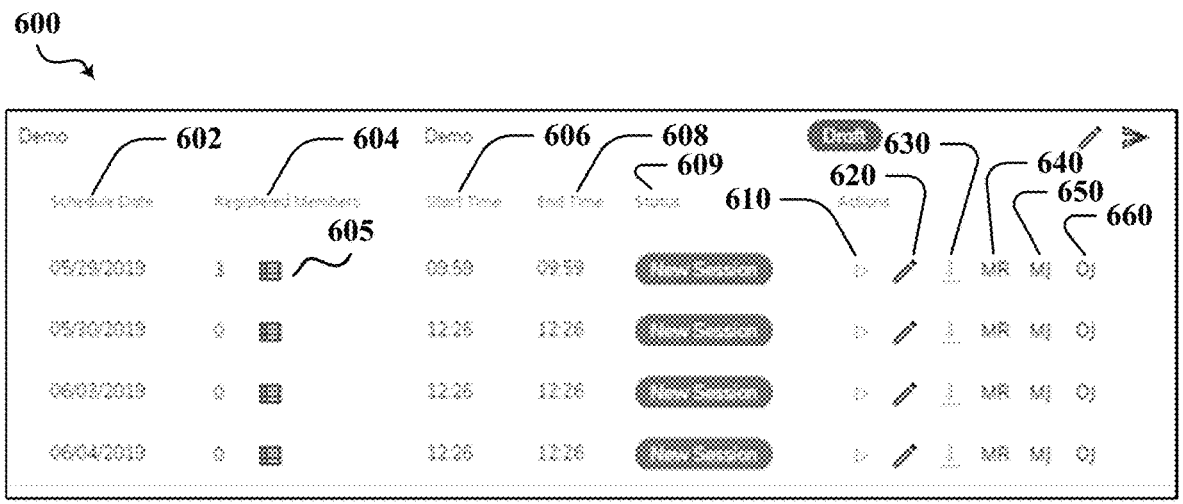
FIG. 6 is an example user interface for managing scheduled sessions session, in accordance with an implementation of the present disclosure.
Figure 13:
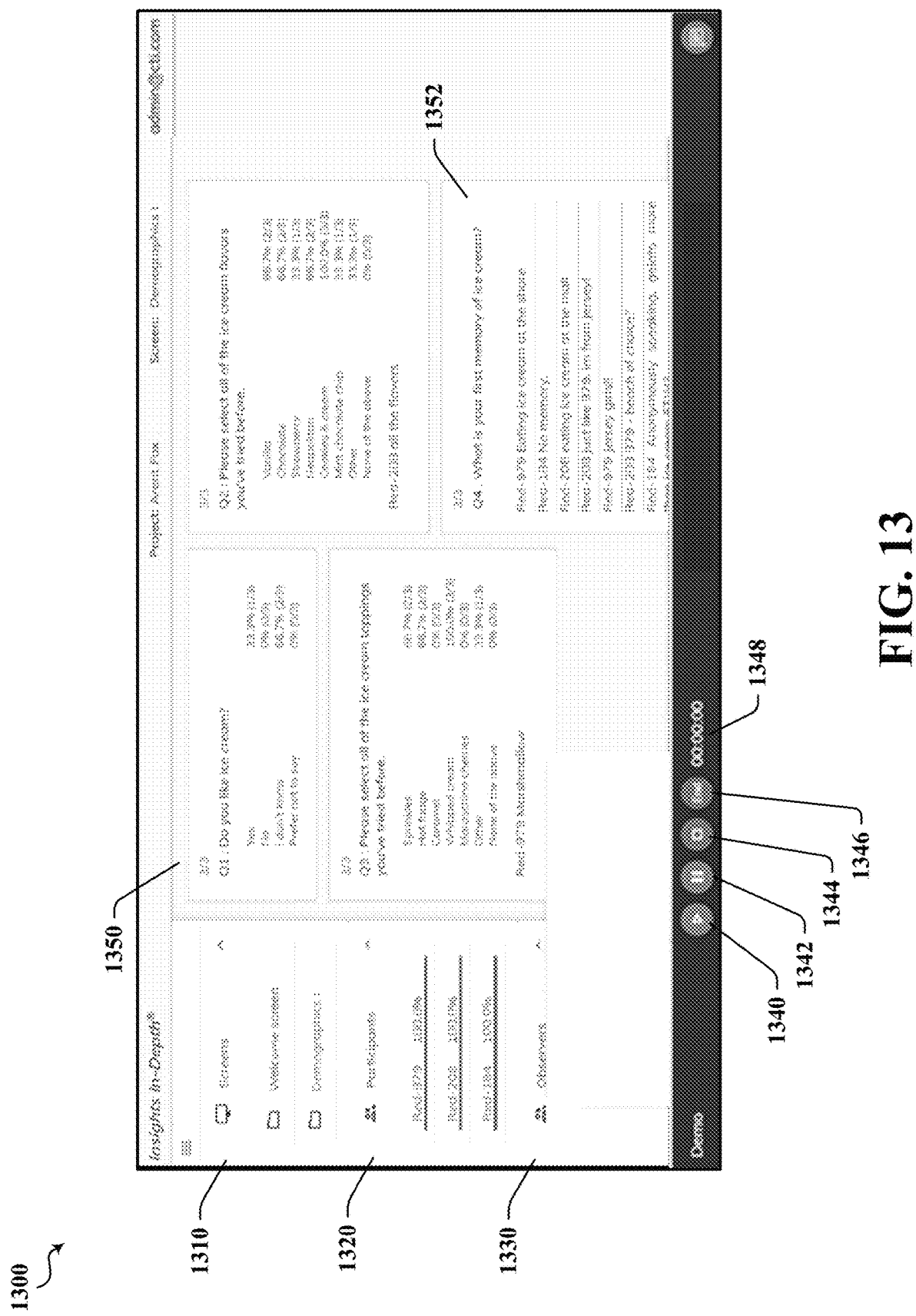
FIG. 13 is an example host interface for guiding a live session, in accordance with an implementation of the present disclosure.

FIG. 6 is an example user interface 600 for managing scheduled sessions. The user interface 600 may display the schedule date 602, number of registered members 604, start time 606, end time 608, and status 609 of a session. An icon 605 next to the number of registered members or participants may cause the user interface 600 to display a complete list of the registered members or participants. The status may be one of a new session, completed session, in-progress session, or cancelled session. The user interface 600 may include a play icon 610, an edit icon 620, a download icon 630, a registration link 640 (MR), a joining link 650 (MJ), and an observer link 660 (OJ). Selection of the play icon 610 may start a host session interface 1300 (FIG. 13). The edit icon 620 may return to the user interface 500. The download icon 630 may download a report for a completed session. The registration link may provide a hyperlink to the participant registration interface 300. The joining link 650 may provide a hyperlink to the participant joining interface 400. The observer link 660 may provide a link to an observer interface.

Figure 7:
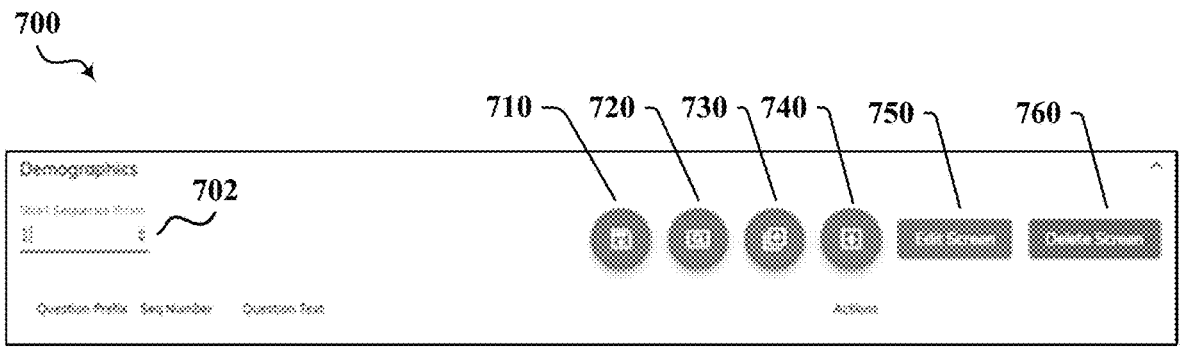
FIG. 7 is an example user interface for generating a question screen, in accordance with an implementation of the present disclosure.
Figure 8:
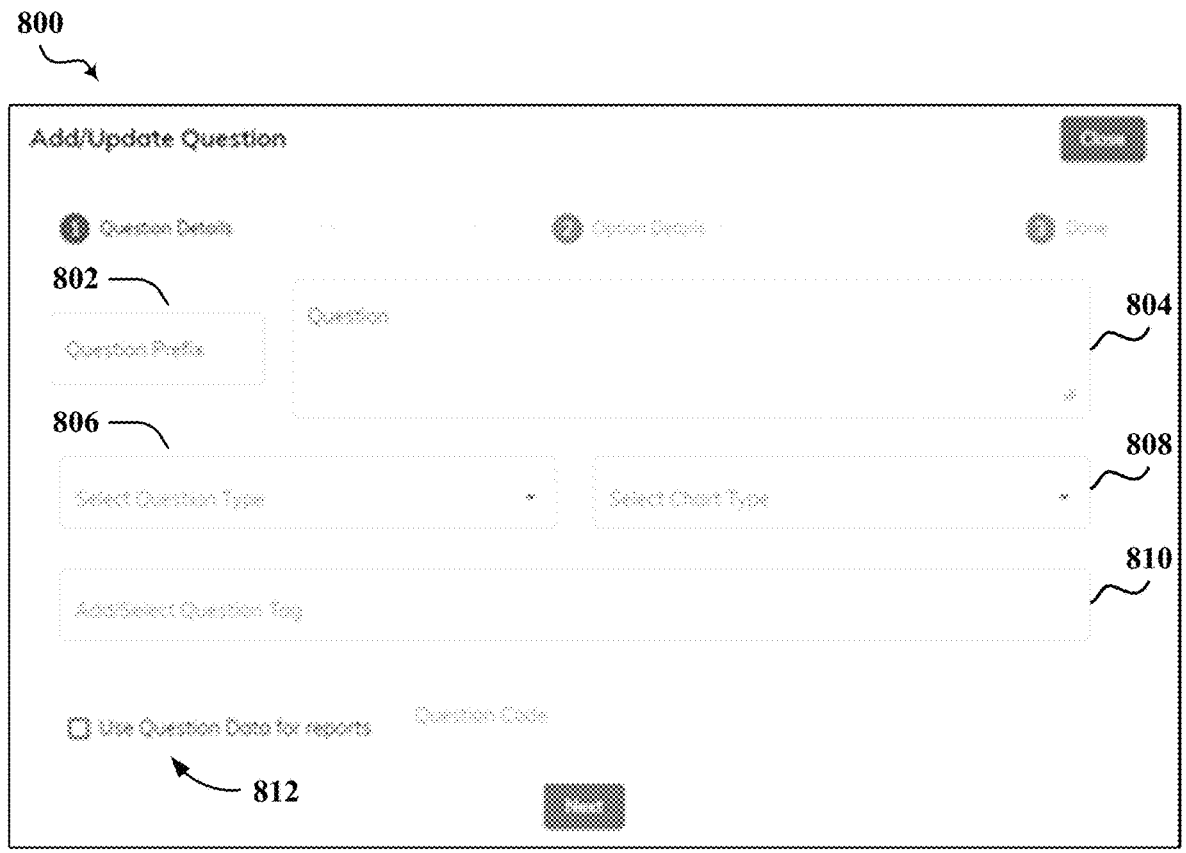
FIG. 8 is an example user interface for editing a question, in accordance with an implementation of the present disclosure.

FIG. 7 is an example user interface 700 for generating a question screen. A session 182 may include a plurality of screens 184, each screen including a plurality of questions. The user interface 700 may include a field 702 for receiving an indication of a start of a question sequence on the screen. The user interface 700 may include a save icon 710, a preview icon 720, a library icon 730, and an add icon 740. The save icon 710 may save any changes to the screen. The preview icon 720 may render the screen as if viewed on a participant interface 132. The library icon 730 may provide a link to a library of saved question objects. The add icon 740 may open a user interface 800 (FIG. 8). The user interface 700 may also include an edit screen button 750 that allows for editing of the screen title (e.g., Demographics). The user interface 700 may include a delete screen button 760 that deletes the current screen.

FIG. 8 is an example user interface 800 for editing a question. The user interface 800 may be provided by the host interface 122, for example, in response to a user selecting the add icon 740. The user interface 800 may include fields for entering a question prefix 802, question text 804, a question type 806, a response chart type 808, and one or more question tags 810. The question prefix 802 may add a prefix before a sequential question number. The question text 804 may include any text entered by a host. The question type 806 may be one of: multiple choice, multiple response, or open box. The question type 806 may control display of response options and logical rules for selection of response options by a participant. The response chart type 808 may allow selection of a type of chart to display responses to the question. Examples of chart types may include a pie chart, donut chart, bar chart, or line chart. The question tags 810 may be associated with a saved question and may be used to search the question library for the saved question. The user interface 800 may include an option 812 to use question data for reports.

Figure 9:
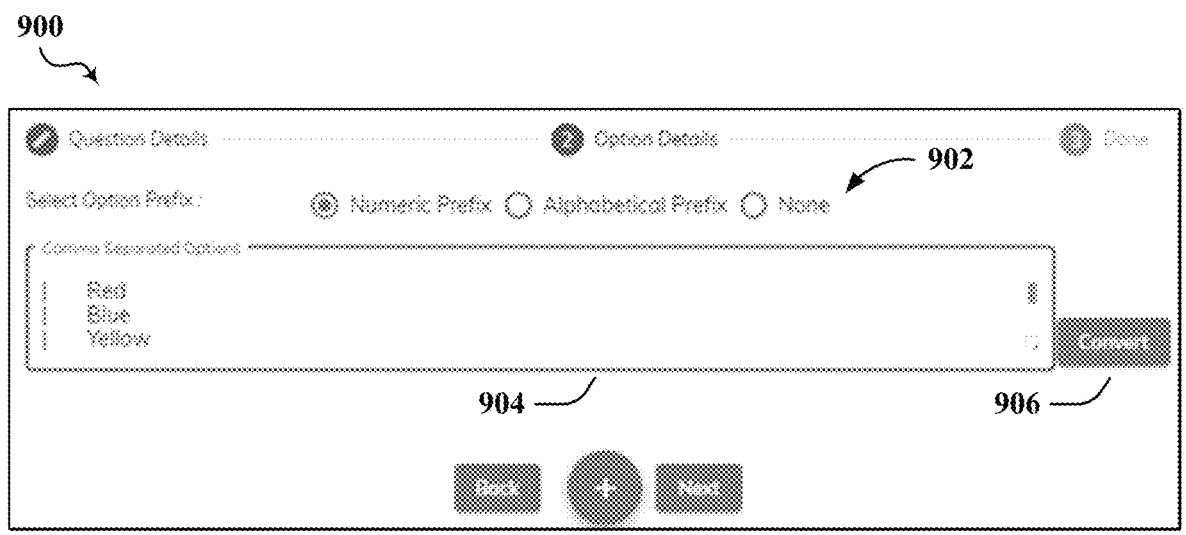
FIG. 9 is an example user interface for generating response options, in accordance with an implementation of the present disclosure.

FIG. 9 is an example user interface 900 for generating response options. The user interface 900 may include choices for an option prefix 902. For example, the option prefix 902 may be a numeric prefix, an alphabetical prefix, or no prefix. The user interface 900 may include an option entry field 904 for entering option text. In an aspect, the response options for a question may be entered as text. A special character may be designated to separate the response options. In some implementations, the special character may be the pipe "|" character. The use of a special character may provide flexibility in the content of the response options. The user interface 900 may include a convert button 906. In response to the host selecting the convert button 906, the session hosting application 160 may convert the text in the option entry field 904 into a plurality of response objects.

Figure 10:
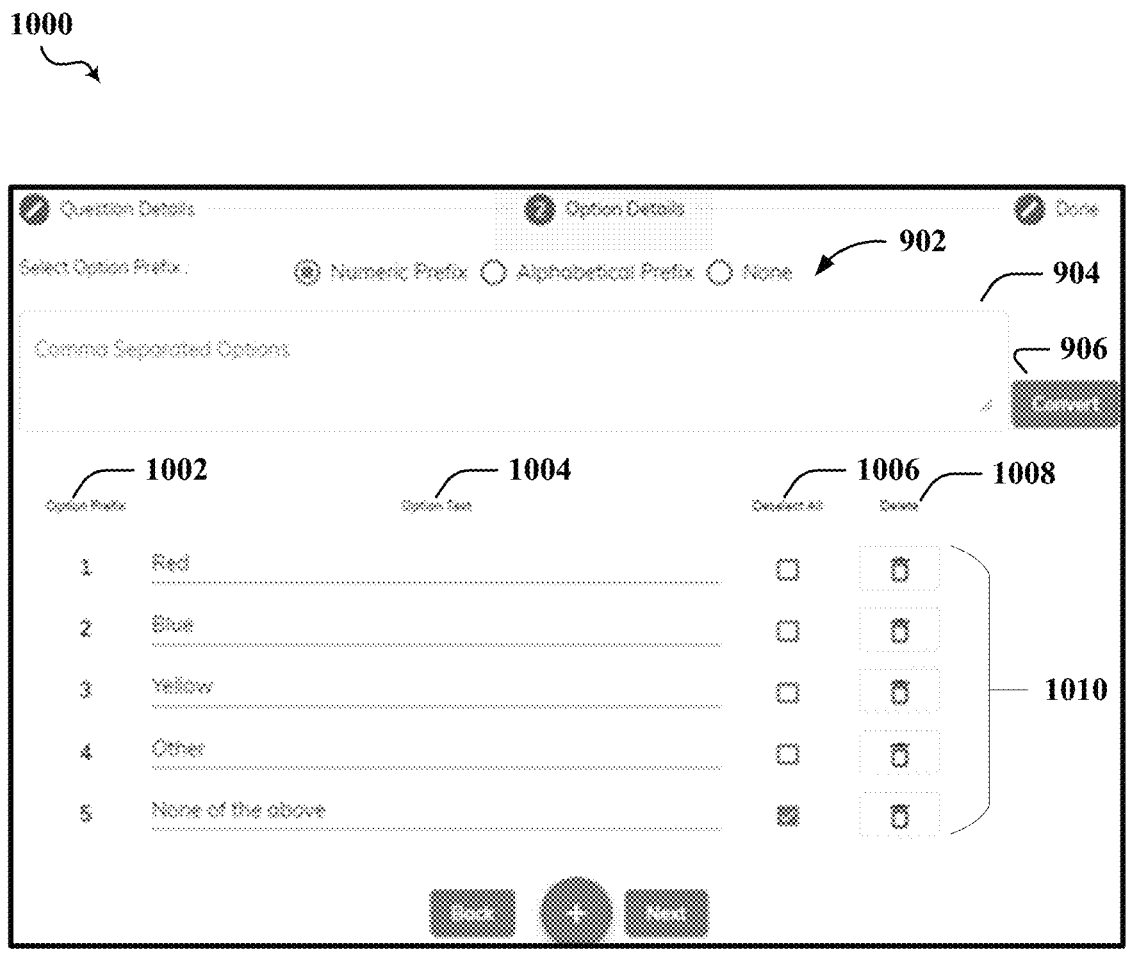
FIG. 10 is an example user interface for editing response options, in accordance with an implementation of the present disclosure.

FIG. 10 is an example user interface 1000 for editing response options. The user interface 1000 may be the user interface 900 after the convert button has been selected. The user interface 1000 may include a plurality of response objects 1010. Each response object 1010 may include an option prefix 1002, an option text 1004, a deselect all option 1006, and a delete icon 1008. The deselect all option 1006 may control whether a participant is allowed to select other options in addition to the response object. In the illustrated example, the response option "None of the above" has the deselect all option selected. Accordingly, the participant interface 132 may deselect all other responses in the list of responses in response to the response being selected by the participant.

Figures 11, 12:
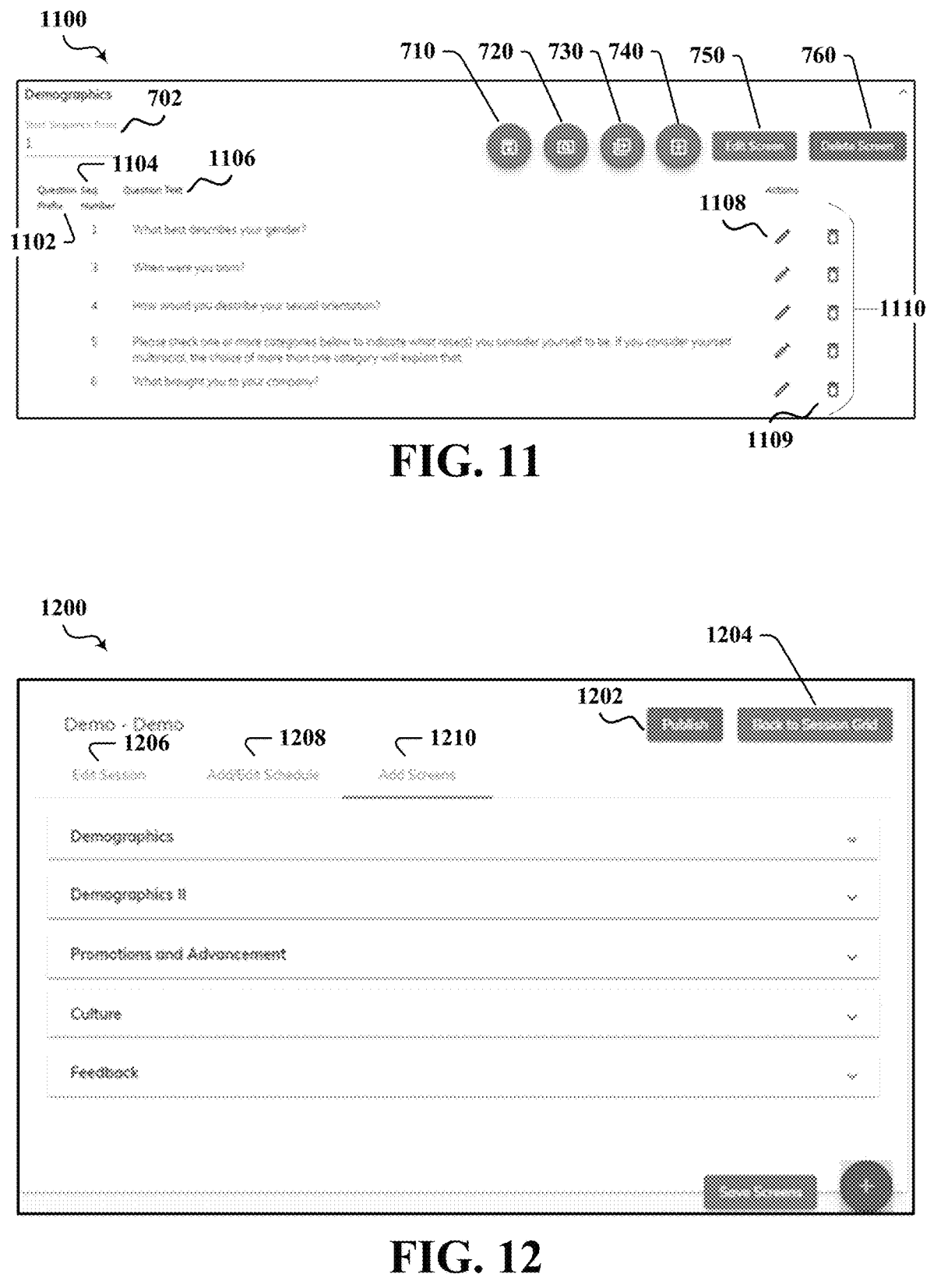

FIG. 11 is an example user interface 1100 for managing a question screen. The user interface 1100 may be similar to the user interface 700. For example, the user interface 1100 may include the field for receiving an indication of a start of a question sequence 702 on the screen, the save icon 710, the preview icon 720, the library icon 730, and the add icon 740. The user interface 1100 may include a list of questions 1110 for the screen. Each question may include a prefix 1102, number 1104, and question text 1106. The user interface 1100 may include an edit icon 1108 for each question. For example, the session hosting application 160 may open the user interface 800 for the corresponding question in response to the edit icon 1108 being selected. The user interface 1100 may include a delete question icon 1109. The session hosting application 160 may delete a corresponding question from the screen in response to the delete question icon 1109 being selected.

FIG. 12 is an example user interface 1200 for managing a session. The user interface 1200 may include a publish button 1202 and a back to session grid button 1204. The session hosting application 160 may change the status of the session from new session to published in response to the publish button 1202 being selected. The session hosting application 160 may return to the user interface 600 in response to the back to session grid button 1204 being selected. The user interface 1200 may also include an edit session button 1206, an add/edit schedule button 1208, and an add screens button 1210. The edit session button 1206 may be a link to the user interface 200. The add/edit schedule button 1208 may be a link to the user interface 500. The add screens button 1210 may be a link to the user interface 700. The user interface 1200 may also include a list of screen objects for the screens 184. The session hosting application 160 may display the questions 186 in response to a screen object being selected.

FIG. 13 is an example host session interface 1300 for guiding a live session. The host session interface 1300 may be provided by the host interface 122. The host session interface 1300 may allow a host to control a live session. The host session interface 1300 may include a navigation panel 1310 that displays a name of each of the plurality of programed screens 184. The navigation panel 1310 may also indicate a current screen displayed to the participants. The host session interface 1300 may include a participant panel 1320 indicating how many of the questions each participant has completed. The host session interface 1300 may include an observer panel 1330 configured to display a private chat between an observer and the host.

The host session interface 1300 may also include session controls including a play button 1340, a pause button 1342, a stop button 1344, an end button 1346, and a timer 1348. The session hosting application 160 may make the session active in response to selection of the play button 1340. When the session is active, participants may provide responses via their respective participant interface 132. The session hosting application 160 may place the session in a pause state in response to selection of the pause button 1342. In the pause state, the participants may not be able to enter responses. In some aspects, if or when the session is in the pause state, the participant interface 132 may display a pause message entered into the message on pause session field 210 of user interface 200. The session hosting application 160 may stop the session in response to selection of the stop button 1344. When the session is stopped, the session hosting application 160 may determine quantitative measures of the responses. The session hosting application 160 may generate a session record including the responses to each question for each participant. The session record for multiple response questions may include a column for each response option including a binary indication of whether each participant selected the response option and a column indicating whether the participant answered the question. The session record may be output as a known file type such as a comma-separated value (CSV) file.

In some aspects, the session record may also include a quantitative analysis of the responses to each question. For example, the session record may include an average value, a mean value, and/or other statistical calculations of the responses to one or more questions. In another example, the session record may indicate a distribution of the responses to a question (e.g., histogram).

In other optional or additional aspects, the session record may comprise a combined transcript of the multi-party session. The combined transcript may indicate the randomized display name corresponding to each entry in the combined transcript. Alternatively or additionally, the session record may include audio and/or video recordings corresponding to the multi-party session.

The session hosting application 160 may end the session in response to selection of the end button 1346. When the session ends, the participants may be disconnected and the respective participant interface 132 may display a message on session end entered in the user interface 200 (e.g., message on end session field 212). In some implementations, the stop button 1344 and the end button 1346 may be a single button. The timer 1348 may display a total time of the session.

The host session interface 1300 may include a response panel 1350. The response panel 1350 may indicate, for each question, selected responses of the participants. For example, for multiple choice questions, the response panel 1350 may display a percentage for each response option. As another example, for a freeform response, the response panel 1350 may include a display area 1352 configured to show responses to the question from other participants. The display area 1352 may act as a chat window and display multiple responses from participants.

Figure 14:
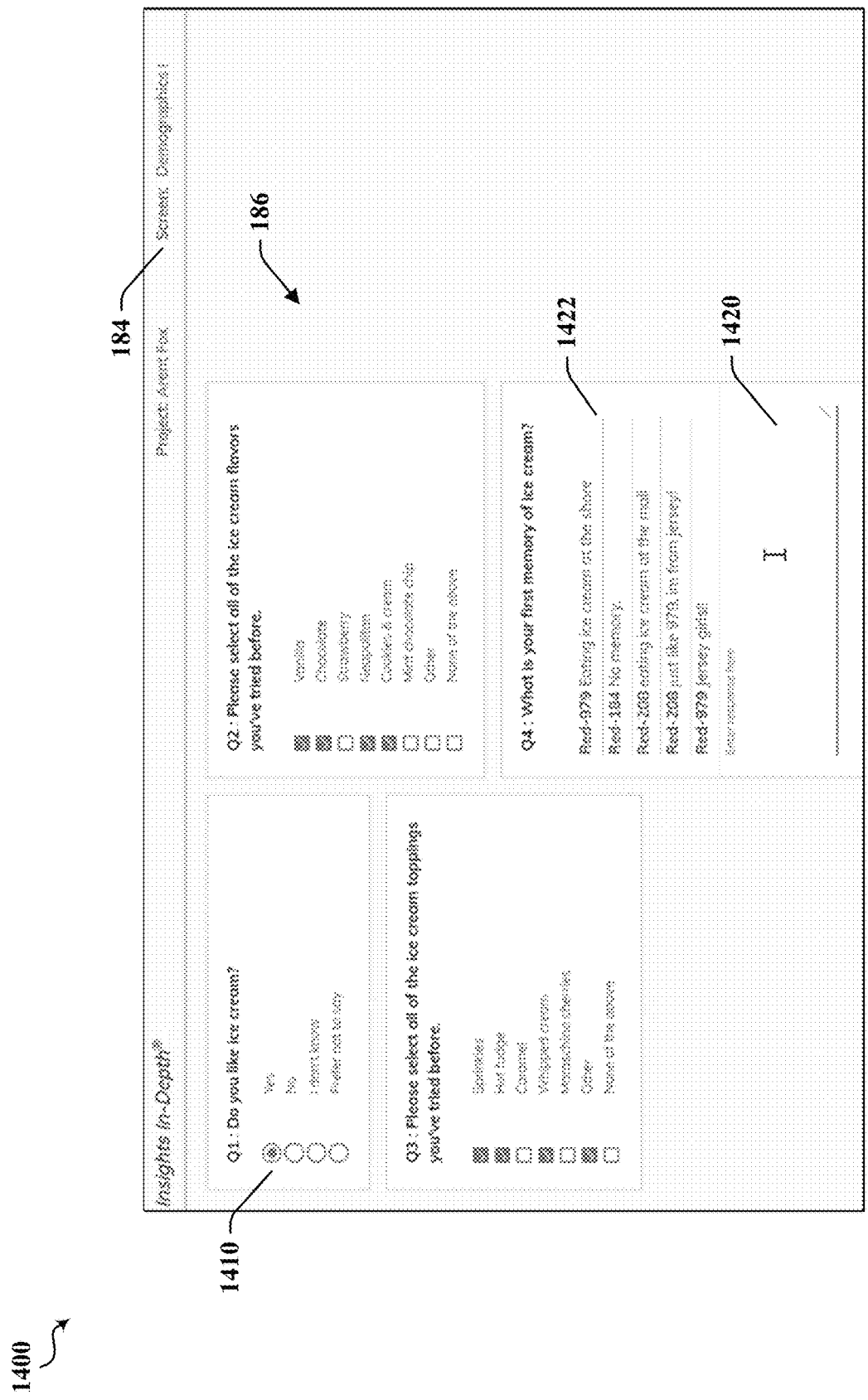
FIG. 14 is an example participant interface for participating during a session, in accordance with an implementation of the present disclosure.

FIG. 14 is an example participant session interface 1400 for participating during a session. The participant session interface 1400 may be provided by the participant interface 132. The participant session interface 1400 may display a programmed screen 184. The screen 184 may include a plurality of questions 186. Each question 186 may include at least one selectable response 1410. For example, question Q1 may be a multiple choice question and questions Q2 and Q3 may be multiple response questions allowing selection of multiple options. Question Q4 may be a freeform question including a text box 1420 configured to receive a freeform response and a display area 1422 configured to show responses to the question from other participants. Each participant may be identified by a randomized name.

Figure 15:
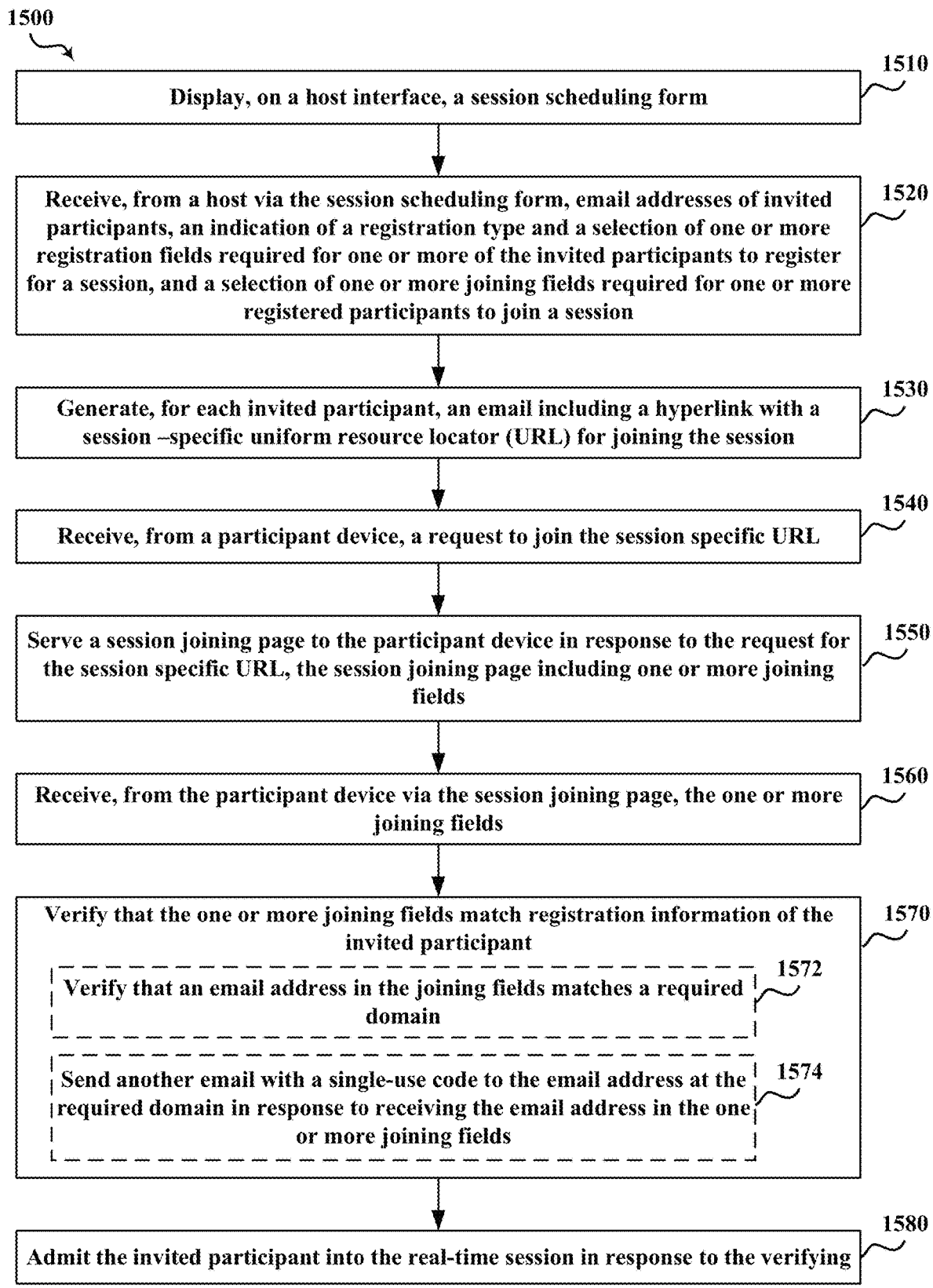
FIG. 15 is a flowchart of an example method of controlling access to a real-time session, in accordance with an implementation of the present disclosure.

FIG. 15 is a flowchart of an example method 1500 of controlling access to a real-time session, in accordance with an implementation of the present disclosure. The method 1500 may be performed by the computer device 110 including the CPU 114 executing the session hosting application 160.

At block 1510, the method 1500 may include displaying, on a host interface, a session scheduling form. For example, the computer device 110 and/or CPU 114 may execute the session hosting application 160 and/or registration module 170 to display, on the host interface 122, a session scheduling form such as the user interface 200.

At block 1520, the method 1500 may include receiving, from a host via the session scheduling form, email addresses of invited participants, an indication of a registration type, a selection of one or more registration fields required for one or more of the invited participants to register for a session, and a selection of one or more joining fields required for one or more registered participants to join a session. For example, the computer device 110 and/or CPU 114 may execute the session hosting application 160 and/or the registration module 170 to receive, from a host via the session scheduling form, email addresses of invited participants, an indication of a registration type, a selection of one or more registration fields 174 required for one or more of the invited participants to register for a session, and a selection of one or more joining fields 176 required for one or more registered participants 172 to join a session.

At block 1530, the method 1500 may include generating, for each invited participant, an email including a hyperlink with a session-specific URL for joining the session. For example, the computer device 110 and/or CPU 114 may execute the session hosting application 160 and/or the registration module 170 to generate, for each invited participant 172, an email including a hyperlink with a session-specific URL for joining the session. For example, the session-specific URL may be a link to the participant joining interface 400.

At block 1540, the method 1500 may include receiving, from a participant device, a request to join the session-specific URL. For example, the computer device 110 and/or CPU 114 may execute the session hosting application 160 and/or the registration module 170 to receive, from a participant device 130, a request to join the session specific URL.

At block 1550, the method 1500 may include serving a session joining page to the participant device in response to the request for the session-specific URL, the session joining page including one or more joining fields. For example, the computer device 110 and/or CPU 114 may execute the session hosting application 160 and/or the registration module 170 to serve a session joining page (e.g., participant joining interface 400) to the participant device in response to the request for the session-specific URL, the session joining page including one or more joining fields (e.g., email address).

At block 1560, the method 1500 may include receiving, from the participant device via the session joining page, the one or more joining fields. For example, the computer device 110 and/or CPU 114 may execute the session hosting application 160 and/or the registration module 170 to receive, from the participant device 130 via the session joining page (e.g., participant joining interface 400), the one or more joining fields 176.

At block 1570, the method 1500 may include verifying that the one or more joining fields match registration information of the invited participant. For example, the computer device 110 and/or CPU 114 may execute the session hosting application 160 and/or the registration module 170 to verify that the one or more joining fields 176 match registration information of the invited participant. For example, the registration module 170 may verify that the email address on the participant joining interface 400 matches the email address from the participant registration interface 300. As another example, at sub-block 1572, the block 1570 may include verifying that an email address in the joining fields 176 matches a required domain. As yet another example, at sub-block 1574, the block 1570 may include sending another email with a single-use code to the email address at the required domain in response to receiving the email address in the one or more joining fields.

At block 1580, the method 1500 may include admitting the invited participant into the real-time session in response to the verifying. For example, the computer device 110 and/or CPU 114 may execute the session hosting application 160 and/or the registration module 170 to admit the invited participant into the real-time session in response to the verifying.

In some aspects, the admitting at block 1580 may include providing audio and/or video communications to the invited participant via a conference call corresponding to the real-time session. For example, the computer device 110 and/or the session hosting application 160 may include a VoIP component, a soft IP telephone, an application for streaming audio and/or video, and/or an application for facilitating real-time communications that may provide audio and/or video communications to the session participants. Alternatively or additionally, the invited participant may be muted and only the host may speak to guide participants through the questions.

Figure 16:
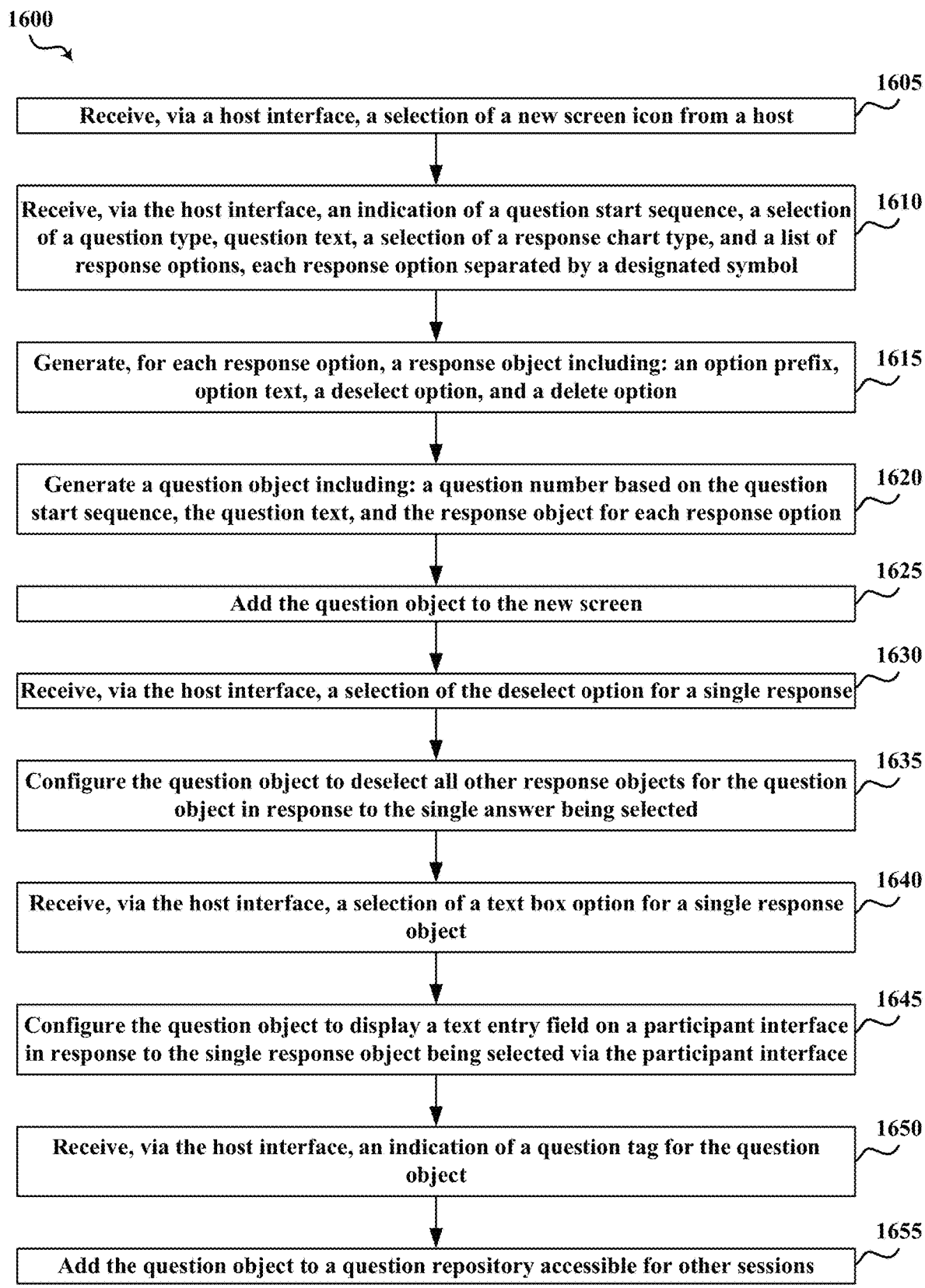
FIG. 16 is a flowchart of an example method of programming a real-time multi-party session, in accordance with an implementation of the present disclosure.

FIG. 16 is a flowchart of an example method 1600 of programming a real-time multi-party session. The method 1600 may be performed by the computer device 110 including the CPU 114 executing the session hosting application 160.

At block 1605, the method 1600 may include receiving, via a host interface, a selection of a new screen icon from a host. For example, the computer device 110 and/or CPU 114 may execute the session hosting application 160 and/or the session component 180 to receive, via a host interface 122, a selection of a new screen icon (e.g., edit icon 620 and/or add screens button 1210) from a host.

At block 1610, the method 1600 may include receiving, via the host interface, an indication of a question start sequence, a selection of a question type, question text, a selection of a response chart type, and a list of response options, each response option separated by a designated symbol. For example, the computer device 110 and/or CPU 114 may execute the session hosting application 160 and/or the session component 180 to receive the completed fields of the user interface 800 and user interface 900 via the host interface 122.

At block 1615, the method 1600 may include generating, for each response option, a response object including: an option prefix, option text, a deselect option, and a delete option. For example, the computer device 110 and/or CPU 114 may execute the session hosting application 160 and/or the session component 180 to generate the response objects of user interface 1000.

At block 1620, the method 1600 may include generating a question object including: a question number based on the question start sequence, the question text, and the response objects for each response. For example, the computer device 110 and/or CPU 114 may execute the session hosting application 160 and/or the session component 180 to generate the question object including: the question number based on the question start sequence, the question text, and the response objects for each response.

At block 1625, the method 1600 may include adding the question object to the new screen. For example, the computer device 110 and/or CPU 114 may execute the session hosting application 160 and/or the session component 180 to add the question object to the new screen.

At block 1630, the method 1600 may optionally include receiving, via the host interface, a selection of the deselect option for a single response object. For example, the computer device 110 and/or CPU 114 may execute the session hosting application 160 and/or the session component 180 to receive, via the host interface 122 and/or user interface 1000, a selection of the deselect option for a single response object. At block 1635, the method 1600 may optionally include configuring the question object to deselect all other response objects for the question object in response to the single response object being selected. For example, the computer device 110 and/or CPU 114 may execute the session hosting application 160 and/or the session component 180 to configure the question object to deselect all other response objects for the question object in response to the single response object being selected by a participant via participant interface 132.

At block 1640, the method 1600 may optionally include receiving, via the host interface, a selection of a text box option for a single response object. For example, the computer device 110 and/or CPU 114 may execute the session hosting application 160 and/or the session component 180 to receive, via the host interface 122, a selection of a text box option for a single response object. At block 1645, the method 1600 may optionally include configuring the question object to display a text entry field on a participant interface in response to the single response object being selected via the participant interface. For example, the computer device 110 and/or CPU 114 may execute the session hosting application 160 and/or the session component 180 to configuring the question object to display a text box 1420 on a participant interface 132 and/or participant session interface 1400 in response to the single response object being selected via the participant interface.

At block 1650, the method 1600 may optionally include receiving, via the host interface, an indication of a question tag for the question object. For example, the computer device 110 and/or CPU 114 may execute the session hosting application 160 and/or the session component 180 to receive, via the host interface 122 and/or the user interface 800, an indication of a question tag for the question object. At block 1655, the method 1600 may optionally include adding the question object to a question repository accessible for other sessions. For example, the computer device 110 and/or CPU 114 may execute the session hosting application 160 and/or the session component 180 to add the question object to a question repository accessible for other sessions. The method 1600 may further include receiving, via the host interface, an indication of an update option; receiving, via the host interface, one or more changes to the questions; and updating the question object in the question repository based on the one or more changes.

Figure 17:
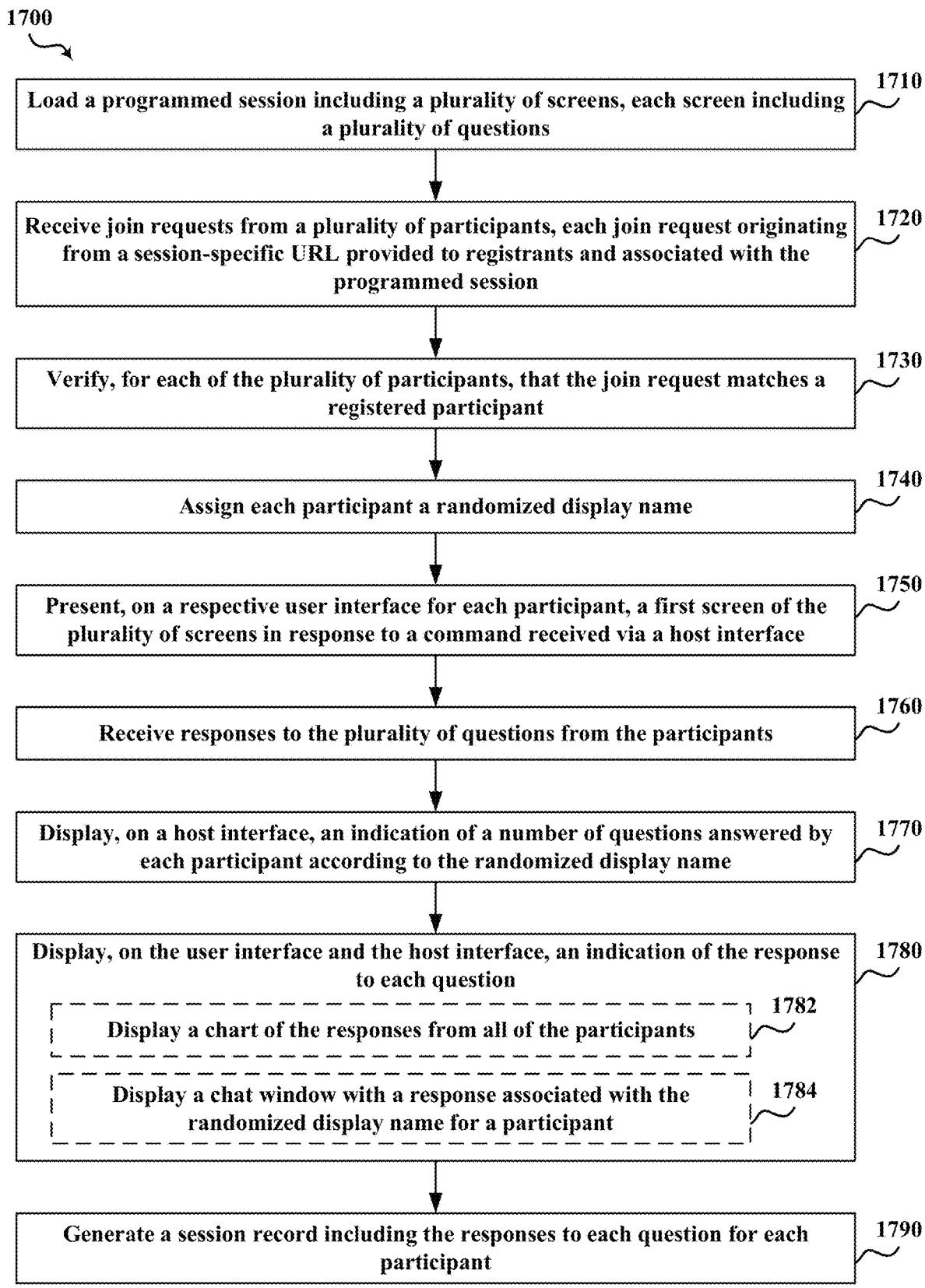
FIG. 17 is a flowchart of an example method of providing a live multi-party session, in accordance with an implementation of the present disclosure.

FIG. 17 is a flowchart of an example method 1700 of providing a live multi-party session. The method 1700 may be performed by the computer device 110 including the CPU 114 executing the session hosting application 160.

At block 1710, the method 1700 may include loading a programmed session including a plurality of screens, each screen including a plurality of questions. For example, the computer device 110 and/or CPU 114 may execute the session hosting application 160 and/or the session component 180 to load a programmed session 182 including the plurality of screens 184, each screen 184 including the plurality of questions 186.

At block 1720, the method 1700 may include receiving join requests from a plurality of participants, each join request originating from a session-specific URL provided to registrants and associated with the programmed session. For example, the computer device 110 and/or CPU 114 may execute the session hosting application 160 and/or the session component 180 to receive join requests from a plurality of participants 172, each join request originating from a session-specific URL provided to registrants and associated with the programmed session 182.

At block 1730, the method 1700 may optionally include verifying, for each of the plurality of participants, that the join request matches a registered participant. For example, the computer device 110 and/or CPU 114 may execute the session hosting application 160 and/or the session component 180 to verify, for each of the plurality of participants 172, that the join request matches a registered participant. For instance, for a domain verified session, the session component 180 may verify that a domain of an email of the participant matches a required domain. As another example, the session component 180 may compare the joining fields 176 with the registration fields 174.

In other optional or additional aspects, the verifying at block 1730 may include providing audio and/or video communications (e.g., VoIP) to the verified participant via a conference call corresponding to the real-time session. Alternatively or additionally, the verified participant may be muted and only the host may speak to guide participants through the questions.

At block 1740, the method 1700 may include assigning each participant a randomized display name. For example, the computer device 110 and/or CPU 114 may execute the session hosting application 160 and/or the session component 180 to assign each participant a randomized display name.

At block 1750, the method 1700 may include presenting, on a respective user interface for each participant, a first screen of the plurality of screens in response to a command received via a host interface. For example, the computer device 110 and/or CPU 114 may execute the session hosting application 160 and/or the session component 180 to present, on a respective user interface (e.g., participant interface 132 and/or participant session interface 1400) for each participant, a first screen of the plurality of screens in response to a command (e.g., play button 1340) received via a host session interface 1300.

At block 1760, the method 1700 may include receiving responses to the plurality of questions from the participants. For example, the computer device 110 and/or CPU 114 may execute the session hosting application 160 and/or the session component 180 to receive responses to the plurality of questions from the participants via the participant session interface 1400.

At block 1770, the method 1700 may include displaying, on a host interface, an indication of a number of questions answered by each participant according to the randomized display name. For example, the computer device 110 and/or CPU 114 may execute the session hosting application 160 and/or the session component 180 to display, on a host session interface 1300, an indication of a number of questions answered by each participant according to the randomized display name.

At block 1780, the method 1700 may include displaying, on the user interface and the host interface, an indication of the response to each question. For example, the computer device 110 and/or CPU 114 may execute the session hosting application 160 and/or the session component 180 to display, on the host session interface 1300 and the participant session interface 1400, the indication of the response to each question. For example, in sub-block 1782, the session component 180 may display a chart of the responses from all of the participants. As another example, in sub-block 1784, the session component 180 may display a display area 1352 or 1422 with a response associated with the randomized display name for a participant.

At block 1790, the method 1700 may include generating a session record including the responses to each question for each participant. For example, the computer device 110 and/or CPU 114 may execute the session hosting application 160 and/or the session component 180 to generate a session record including the responses to each question for each participant. The session record for multiple response questions may include a column for each response option including a binary indication of whether each participant selected the response option and a column indicating whether the participant answered the question. The session record may be output as a known file type such as a comma-separated value (CSV) file.

In some aspects, the session record may also include a quantitative analysis of the responses to each question. For example, the session record may include an average value, a mean value, and/or other statistical calculations of the responses to one or more questions. In another example, the session record may indicate a distribution of the responses to a question (e.g., histogram).

In other optional or additional aspects, the session record may comprise a combined transcript of the multi-party session. The combined transcript may indicate the randomized display name corresponding to each entry in the combined transcript. Alternatively or additionally, the session record may include audio and/or video recordings corresponding to the multi-party session.

Figure 18:
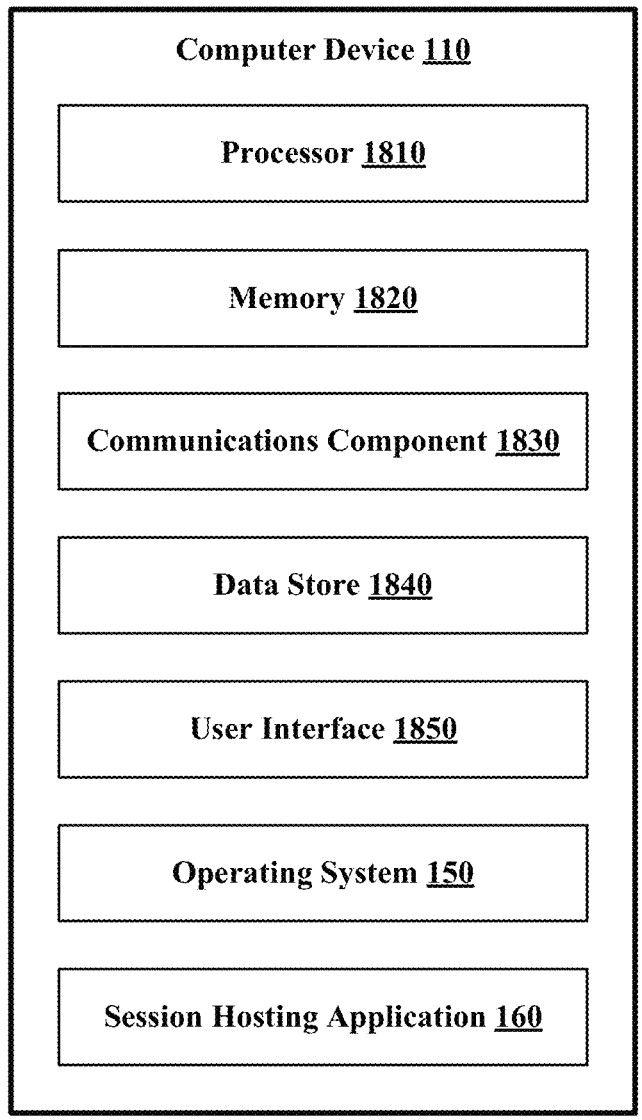
FIG. 18 is a schematic block diagram of an example computer device, in accordance with an implementation of the present disclosure.

Referring now to FIG. 18, illustrated is an example computer device 110 in accordance with an implementation, including additional component details as compared to FIG. 1. In one example, computer device 110 may include processor 1810 for carrying out processing functions associated with one or more of components and functions described herein. Processor 1810 can include a single or multiple set of processors or multi-core processors. Moreover, processor 1810 can be implemented as an integrated processing system and/or a distributed processing system. In an implementation, for example, processor 1810 may include CPU 114.

In an example, computer device 110 may include memory 1820 for storing instructions executable by the processor 1810 for carrying out the functions described herein. In an implementation, for example, memory 1820 may include memory 116. The memory 1820 may include instructions for executing the session hosting application 160.

Further, computer device 110 may include a communications component 1830 that provides for establishing and maintaining communications with one or more parties utilizing hardware, software, and services as described herein. Communications component 1830 may carry communications between components on computer device 110, as well as between computer device 110 and external devices, such as devices located across the communications network 154 and/or devices serially or locally connected to computer device 110. For example, communications component 1830 may include one or more buses, and may further include transmit chain components and receive chain components associated with a transmitter and receiver, respectively, operable for interfacing with external devices. In an implementation, for example, communications component 1830 may include network interface 112 of FIG. 1. In another optional or additional implementation, the communications component 1830 may include a VoIP component, a soft IP telephone, an application for streaming audio and/or video, and/or an application for facilitating real-time communications that may provide audio and/or video communications to the session participants.

Additionally, computer device 110 may include a data store 1840, which can be any suitable combination of hardware and/or software, that provides for mass storage of information, databases, and programs employed in connection with implementations described herein. For example, data store 1840 may be a data repository for operating system 150 and/or applications 152. The data store may include memory 116 and/or storage device 118.

Computer device 110 may also include a user interface component 1850 operable to receive inputs from a user of computer device 110 and further operable to generate outputs for presentation to the user. User interface component 1850 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 1850 may include one or more output devices, including but not limited to a display, a speaker, a haptic feedback mechanism, a printer, any other mechanism capable of presenting an output to a user, or any combination thereof.

In an implementation, user interface component 1850 may transmit and/or receive messages corresponding to the operation of operating system 150 and/or applications 152. In addition, processor 1810 may execute operating system 150 and/or applications 152, and memory 1820 or data store 1840 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. Computer-readable media includes may be referred to as non-transitory computer-readable media. Non-transitory computer-readable media may exclude transitory signals. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of controlling access to a real-time session, comprising:

displaying, on a host interface, a session scheduling form;

receiving, from a host via the session scheduling form, email addresses of invited participants, an indication of a registration type and a selection of one or more registration fields required for one or more of the invited participants to register for a session, and a selection of one or more joining fields required for one or more registered participants to join a session;

generating, for each invited participant, an email including a hyperlink with a session-specific uniform resource locator (URL) for joining the session;

receiving, from a participant device, a request to join the session-specific URL;

serving a session joining page to the participant device in response to the request for the session-specific URL, the session joining page including one or more joining fields;

receiving, from the participant device via the session joining page, the one or more joining fields;

verifying that the one or more joining fields match registration information of the invited participant;

admitting the invited participant into the real-time session in response to the verifying;

assigning the invited participant a randomized display name; and displaying the randomized display name of the invited participant to one or more other invited participants.

2. The method of claim 1, wherein the verifying comprises verifying that an email address in the one or more joining fields matches a required domain.

3. The method of claim 2, wherein verifying that the email address in the one or more joining fields matches the required domain comprises sending another email with a single-use code to the email address at the required domain in response to receiving the email address in the one or more joining fields.

4. The method of claim 1, further comprising:
receiving, via the host interface, a selection of a new screen icon from the host;
receiving, via the host interface, an indication of a question start sequence, a selection of a question type, question text, a selection of a response chart type, and a list of response options, each response option separated by a designated symbol;
generating, for each response option, a response object including: an option prefix, option text, a deselect option, and a delete option;
generating a question object including: a question number based on the question start sequence, the question text, and the response object for each response; and
adding the question object to the new screen.

5. The method of claim 4, further comprising:
receiving, via the host interface, a selection of the deselect option for a single response object; and
configuring the question object to deselect all other response objects for the question object in response to the single response object being selected.

6. The method of claim 4, further comprising:
receiving, via the host interface, a selection of a text box option for a single response object; and
configuring the question object to display a text entry field on a participant interface in response to the single response object being selected via the participant interface.

7. The method of claim 4, further comprising:
receiving, via the host interface, an indication of a question tag for the question object; and
adding the question object to a question repository accessible for other sessions.

8. The method of claim 7, further comprising:
receiving, via the host interface, an indication of an update option;
receiving, via the host interface, one or more changes to the questions; and
updating the question object in the question repository based on the one or more changes.

9. A method of providing a live multi-party session, comprising:
loading a programmed session including a plurality of screens, each screen including a plurality of questions;
receiving join requests from a plurality of participants, each join request originating from a session-specific URL provided to registrants and associated with the programmed session;
verifying, for each of the plurality of participants, that the join request matches a registered participant;
assigning each participant a randomized display name;
presenting, on a respective user interface for each participant, a first screen of the plurality of screens in response to a command received via a host interface;
receiving responses to the plurality of questions from the participants;
displaying, on a host interface, an indication of a number of questions answered by each participant according to the randomized display name; and
displaying, on the user interface and the host interface, an indication of the response from one or more participants to one or more of the plurality of questions according to the randomized display name.

10. The method of claim 9, wherein displaying the indication of the responses to each question comprises displaying a chart of the responses from all of the participants.

11. The method of claim 9, wherein displaying the indication of the responses to the one or more of the plurality of questions comprises displaying a chat window with a response associated with the randomized display name for a participant.

12. The method of claim 9, further comprising generating a session record including the responses to each question for each participant, wherein the session record for multiple response questions includes a column for each response option including a binary indication of whether each participant selected the response option and a column indicating whether the participant answered the question.

13. The method of claim 12, wherein generating the session record comprises generating the session record comprising at least one of:
a combined transcript of the multi-party session;
a quantitative analysis of the responses to each question;
an audio recording of the multi-party session; or
a video recording of the multi-party session.

14. A system for providing a live multi-party session, comprising:
a memory storing computer-executable instructions; and
a processor configured to execute the computer-executable instructions to cause the system to:
load a programmed session including a plurality of screens, each screen including a plurality of questions;
receive join requests from a plurality of participants, each join request originating from a session-specific URL provided to registrants and associated with the programmed session;
verify, for each of the plurality of participants, that the join request matches a registered participant;
assign each participant a respective randomized display name;
present a participant interface that displays a first screen of the plurality of screens on a participant device in response to a command received via a host interface, each question including at least one selectable response, wherein at least one of the selectable responses includes a text box configured to receive a freeform response and a display area configured to show responses to the question from other participants, each participant identified by the respective randomized display name in the display area;
receive responses to the plurality of questions from the participants; and
present a host user interface including:
a navigation panel that displays a name of each of a plurality of programmed screens and indicates the programmed screen displayed to the participants;
a participant panel indicating how many of the questions each participant has completed according to the randomized display name; and
a response panel indicating, for each question, selected responses of the participants, wherein, for the freeform response, the response panel includes the display area configured to show responses to the question from other participants.

15. The system of claim 14, wherein the processor is configured to execute the computer-executable instructions to cause the system to display an observer interface configured to display the response panel.

16. The system of claim 15, wherein the host user interface and the observer interface each comprise an observer panel configured to display a private chat between the observer and the host user.

17. The system of claim 14, wherein the processor is configured to execute the computer-executable instructions to cause the system to:

receive, from the host via a scheduling form, email addresses of invited participants, an indication of a registration type and a selection of one or more registration fields required for one or more of the invited participants to register for the session, and a selection of one or more joining fields required for one or more registered participants to join a session;

generate, for each invited participant, an email including a hyperlink with a session-specific uniform resource locator (URL) for joining the session;

receive, from a participant device, a request for the session-specific URL;

serve a session joining page to the participant device in response to the request for the session-specific URL, the session joining page including one or more joining fields;

receive, from the participant device via the session joining page, the one or more joining fields;

verify that the one or more joining fields match registration information of the invited participant; and admit the invited participant into the live multi-party session in response to the verifying.

* * * * *